United States Patent [19]
Jones et al.

[11] Patent Number: 5,113,792
[45] Date of Patent: May 19, 1992

[54] ARTIFICIAL REEF MODULE

[76] Inventors: Barton G. Jones, 809 Harbor House Dr. #1, Madison, Wis. 53719; Ray E. Green, 3363 Jackson St., College Park, Ga. 30337; Eldon C. Blancher, II, 300 Fern Hill Ct., Mobile, Ala. 36608

[21] Appl. No.: 705,024

[22] Filed: May 22, 1991

[51] Int. Cl.$^5$ ............................................. A01K 61/00
[52] U.S. Cl. ............................................. 119/3; 119/4; 405/25; 405/30
[58] Field of Search ................ 405/21, 23, 27, 30-35; 119/2, 3, 4

[56] References Cited

U.S. PATENT DOCUMENTS

| | | | |
|---|---|---|---|
| 4,316,431 | 2/1982 | Kimura | 119/3 |
| 4,334,499 | 6/1982 | Baass | 119/3 |
| 4,465,399 | 8/1984 | Kikuzawa et al. | 405/32 |
| 4,668,443 | 3/1987 | Rye | 261/112 |
| 4,790,685 | 12/1988 | Scott et al. | 405/30 |
| 4,818,141 | 4/1989 | Rauch | 405/30 |
| 4,840,516 | 6/1989 | Rambo | 405/33 |
| 4,877,349 | 10/1989 | Greene | 405/27 |
| 4,913,094 | 4/1990 | Jones et al. | 119/3 |
| 4,913,595 | 4/1990 | Creter et al. | 405/30 |
| 4,947,791 | 8/1990 | Laier et al. | 119/3 |
| 4,954,013 | 9/1990 | Lamberton | 405/25 |
| 4,993,362 | 2/1991 | Jimbo | 119/3 |
| 4,997,311 | 3/1991 | Van Doren | 405/30 |

Primary Examiner—David H. Corbin
Attorney, Agent, or Firm—Andrus, Sceales, Starke & Sawall

[57] ABSTRACT

An improved artificial reef module for creating a feeding and shelter habitat for fish is disclosed. The artificial reef module includes a column of vertically or horizontally arranged sheets of corrugated material. The corrugated channels of each sheet run transverse to the adjacent sheet, thereby providing a system of complex channels and passageways within the module. Additionally, the flutes of one sheet may have a different height from the flutes of an adjacent sheet, thereby adding to the complexity of the passage system.

7 Claims, 7 Drawing Sheets

ARTIFICIAL REEF MODULE

FIELD OF THE INVENTION

The present invention relates generally to an artificial reef system. The present invention is specifically directed to improvements in artificial reef habitats.

BACKGROUND OF THE INVENTION

Fishermen have long known that many species of fish congregate seasonally in areas of pronounced topographic changes in the sea bottom. These areas tend to concentrate particulate matter which enhance microbial (bacterial) growth and promote the propagation of other elements within the food chain. This environment, along with the natural shelter provided by the physical relief of bottom features, is the basis for fish attraction to the structure.

Artificial reefs are submerged structures designed to mimic the habitat provided by natural reefs. They are generally designed for the purpose of enhancing fishery resources or commercial or recreational opportunities, and in the remediation, mitigation or enhancement of adversely impacted marine ecosystems. The artificial reef enhancement causes fish aggregation and increased fish population (including spawning) in areas which are virtually devoid of either reef or pelagic species.

The first artificial reefs were actually shipwrecks and were noted to be extremely effective in attracting fish. Large artificial reef construction efforts involve the disposal of old ships and oil drilling structures, the disposal of used tires and the deposition of coal combustion waste products.

Waste materials such as coal slag and stabilized fly ash have been proposed as reef materials. The need to dispose of these waste products and the limitation of existing landfill capacity appear to be the driving force behind this effort.

Automobile tires and concrete shapes are now the most commonly used products for artificial reef systems because of their availability. Automobile bodies and appliances have also been used extensively. The use of tires is reportedly no longer permissible by United States regulatory agencies, and car bodies or appliances are discouraged because of their tendency to rust away rapidly.

Concrete and stone provide suitable materials for artificial reef construction because of their density, durability and low cost. However, heavy equipment requirements for deployment and costs of transportation have greatly limited the application of these materials.

A current approach to reef design is to create those aspects of natural reefs which are important to desired fauna. This differs from the earlier methodology of using scrap materials or rocks to recreate only the structure of natural reefs. Many of the newer reef units are fabricated from reinforced or prestressed concrete, steel, fiberglass or a variety of composite materials. These artificial reefs offer a number of advantages over either scrap material or rock reefs. The flexibility inherent in a design structure permits the fabrication of modules which are stable, permanent and effective for the reef objectives. Examples of some artificial reefs follow.

Van Doren U.S. Pat. No. 4,997,311 is directed to an artificial reef construction employing a dome-shaped, thin-walled enclosure of plastic material having apertures to permit aquatic life to enter and exit.

Laier et al. U.S. Pat. No. 4,947,791 is directed to an artificial reef consisting of a system of flexible, buoyant geometric bodies, each being formed of a plastic material and having a large plurality of holes or openings. The bodies are anchored to the ocean floor and allowed to float, via a tether line, above the ocean floor.

Rambo U.S. Pat. No. 4,840,516 is directed to an artificial reef formed of a plurality of connected adjacent blocks assembled in side-by-side relation, with each block alternately having downwardly extending trapezoidal, prismatic projections.

Kimura U.S. Pat. No. 4,316,431 is directed to an artificial reef constructed with square bar materials and plate materials. The plate materials are ultimately piled on the bar materials in a manner to provide open spaces for shelter.

Baass U.S. Pat. No. 4,334,499 is directed to an artificial reef system having a base portion formed by a discarded tire partially filled with concrete. A plurality of strands of wire rope extend through apertures formed in the upper side wall of the tire. These strands are allowed to sway in the ocean current to mimic a flora environment.

Kikuzawa et al. U.S. Pat. No. 4,465,399 is directed to an artificial reef system comprising a plurality of hollow cylindrical structures attached together.

Rauch U.S. Patent No. 4,818,141, Creter, Jr. et al. U.S. Pat. No. 4,913,595, and Scott et al. U.S. Pat. No. 4,790,685 are all directed to shoreline breakwater systems to prevent shoreline erosion. While not technically artificial reefs, the systems include base modules placed adjacent to the shoreline in a sloping fashion to deflect and slow down the incoming waves.

One major problem with many reef materials is that the development of the primary film of microorganism, necessary for the establishment of a suitable aquaculture community, is inhibited. Many plastics, metals and other materials contain toxins which prevent the growth of the initial film of microorganisms in much the same way as anti-fouling paint inhibits biofouling. Some materials, such as metals, slough off over time, thereby removing the coating of biofouling organisms. Without the establishment of a permanent biofouling community, a true reef is never formed.

One solution to the problem associated with artificial reef structures is disclosed in the inventors' own U.S. Pat. No. 4,913,094, which is incorporated herein by reference in its entirety. U.S. Pat. No. 4,913,094 discloses a system of artificial reef modules intended to be positioned on the floor of a body of water for creating a feeding and shelter environment for fish. The module includes a column of corrugated sheets formed of polyvinyl chloride (PVC), each sheet having a predetermined surface area for allowing the attachment and growth of microorganisms. The sheets are attached together along their length so that a plurality of partially enclosed spaces are created to act as shelter for small fish from their predators.

SUMMARY OF THE INVENTION

The present invention provides an improvement over U.S. Pat. No. 4,913,094 by the addition of various embodiments intended to enhance the attraction of microorganisms on the artificial reef system, which microorganisms are necessary for the establishment of a viable ecosystem on the artificial reef. It is therefore a principal object of the present invention to provide an artificial reef system comprised of modules which induce the establishment of a food chain augmented within an underwater structural/sheltering habitat.

This and other objects are addressed by the present invention, which is directed to an artificial reef module and/or a system of artificial reef modules. The module includes a column formed of a plurality of semi-rigid, corrugated planar sheets, suitable for the attachment and growth of microorganisms. Each corrugation in the sheets is termed a flute. Each sheet is attached to an adjacent sheet in such a manner that the flutes of the adjacent sheets are in a transverse or criss-cross pattern. By this configuration, a plurality of sinusoidal channels, formed by the flute pattern of adjacent corrugated sheets, are provided from one end of the module to the other. The channels provide a plurality of enclosed spaces to create a habitat and protection for small fish and crustaceans. Further, in view of the sinusoidal arrangement, the chambers will also act as a filter to the constant wave current of water flowing through the artificial reef module.

The flutes of each adjacent sheet preferably have varying heights. The difference in height will advantageously assist the water current flow and solids settling process, thereby also assisting in the required development of microorganism colonies on the module.

The fluted corrugations of each sheet are also designed to impede the complete denuding of attached microorganisms by surface-feeding animals, thereby allowing for at least a nucleus of microorganisms to continue to proliferate.

The present invention is also directed to a device for establishing a variety of populations of heterogenous organisms on an artificial reef module, comprising a column formed of a plurality of planar sheets, each sheet comprising a plurality of parallel flutes. The sheets are superposed and attached together along their length with the respective flutes of adjacent sheets extending transverse to each other to form a plurality of channels and mixing and redistribution points for microorganisms within a fluid environment. At least one sheet of the column includes flutes having a different height from the flutes of an adjacent sheet. The device also includes anchoring means attached to one end of the column for securing the column to the floor of a body of water. The flutes of each planar sheet include sidewalls positioned at an angle and depth sufficient to prevent the total denuding of microorganisms from the surface of the planar sheet by predatory organisms.

The present invention is also directed to a method for establishing a variety of species of marine life in an underwater locale. The method includes placing one or more artificial reef modules of the present invention in a body of water inhabited by the marine life; settling and developing a microbial population of a first species of microorganisms on the artificial reef module; partially denuding, i.e., removing the microorganisms from the surfaces of the modules, the surface of the artificial reef module; settling and developing a microbial population of a second species of microorganism on the module sufficient to provide for a suitable attractant for fish attracted to that particular species; and continuing this process until other species of microorganisms settle and develop on the artificial reef module.

This invention also provides for a filtering/settling phenomenon designed to establish one or more populations of microorganisms in a particular locus on the artificial reef module. It is known that microorganism populations, which are desired for colonization on the artificial reef structure, tend to move in an undersea wave as a homogeneous mass. As such, an entire "wave" of a single species of microorganism will likely wash over and filter through the entire reef module, thereby inhabiting the entire structure. Because various species of microorganisms attract different species of fish and sea life, it is desirable to have several species of microorganisms attach to the module. This is accomplished by the structural design of the present invention, which allows for only partial denuding of the surface of the structure. The denuded surface provides an attracting area for the next wave of microorganism. After several cycles, the artificial reef structure will become inhabited by a variety of microorganism species, providing the requisite food chain to satisfy and attract a variety of marine species.

The artificial reef module and system of the present invention provides a reef system which is as biologically prolific as natural reefs. It can be used for aquaculture projects and/or environmental remediation and enhancement of marine ecosystems, which become adversely impacted by land reclamation, pollution or overfishing.

The rugosity, i.e., corrugated appearance, and complexity of the reef module accommodates a highly diverse assemblage of organisms found on natural reef systems. Once the system of reef modules is in place, it will form the "skeleton or backbone" for the reef assemblage and will ultimately be "welded" together by encrusting organisms to form a natural reef.

The module also promotes the settling of larval forms of various invertebrate organisms by virtue of reducing the horizontal and vertical velocity of water currents, which carry the organisms in suspension. The "slow down," as the water currents flow through the channels in the module, causes the organisms to fall out of the water and onto the surface of adjacent sheets making up the artificial reef module. This provides for new organisms to settle throughout the year so that all types of organisms, over the annual cycle, will have the opportunity to settle.

The artificial reef system provides partially enclosed areas to shelter numerous organisms from predation by invertebrate and vertebrate organisms, thereby enhancing the longevity and vitality of the reef system.

Another advantage stems from the arrangement of the sheets in a diverse pattern with variation in the size of the spaces provided. The variation in size between the adjacent sheet creates an uneven flow rate of the water current through the reef module, thereby enhancing the filtering of microorganisms and their setting and attachment on the reef module. The settled microorganisms provide the basic nutrients in the food chain necessary to attract organisms of a variety of sizes.

The present invention also provides for an artificial reef unit which concentrates nutrients within the water column through the physical attraction of biogenic macromolecules present in the ocean and the settling of larger particulate materials, which serve as food for the filter-feeding organisms on the surface of the reef units.

The artificial reef of the present invention can be located where there are no natural structures to provide suitable habitat. Areas of sand and mud bottoms with no outcrops of surface relief are prime examples of the locations for suitable reef deployment. By enhancing the physical and biological environment in barren bottom areas with artificial reefs, a stable and productive marine habitat can be created.

Further objects, features and advantages of the invention will be apparent from the following detailed description when taken in conjunction with the accompanying drawings.

DETAILED DESCRIPTION OF THE INVENTION

Figure 1:
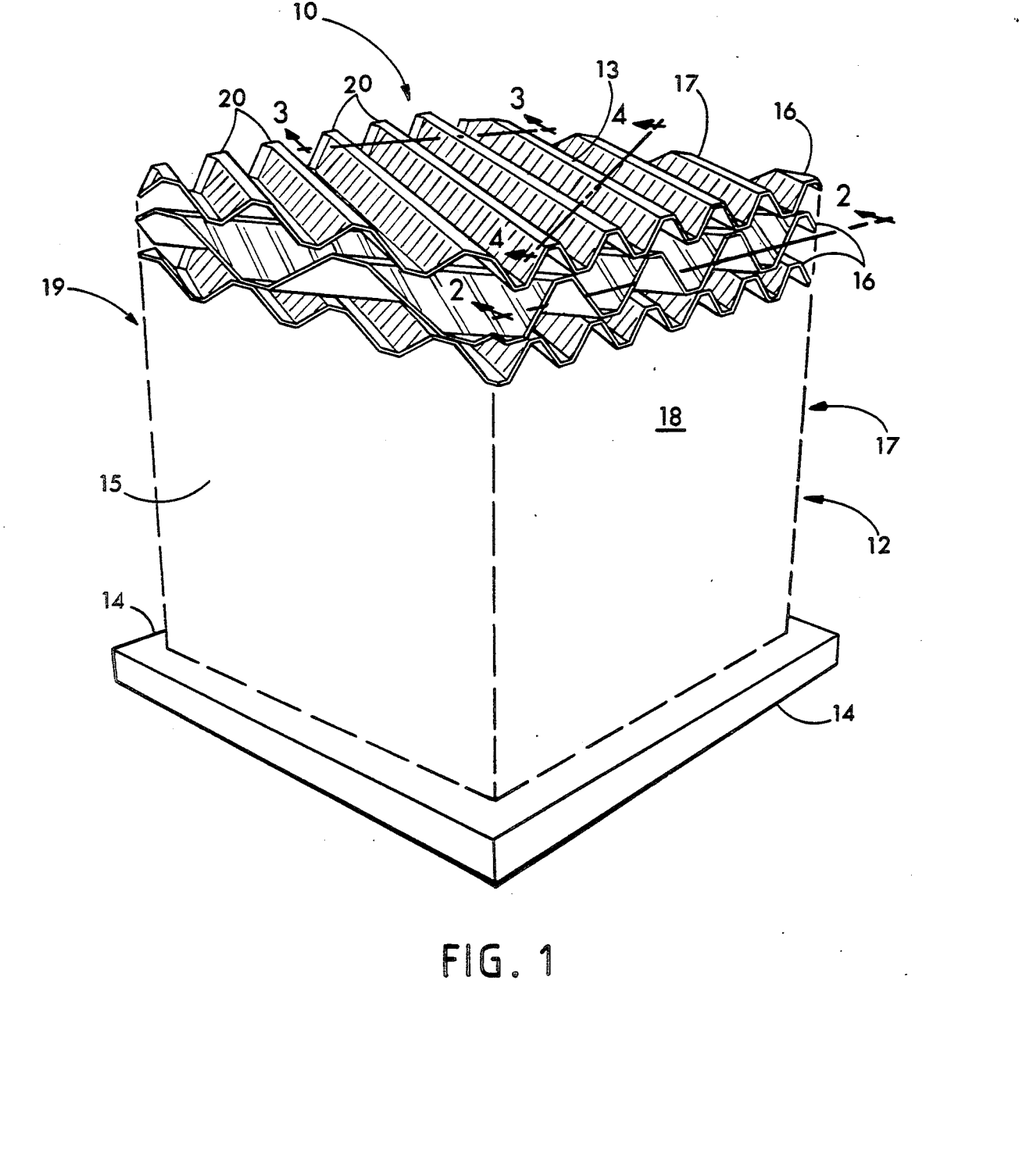
FIG. 1 is a perspective view of an artificial reef module of the present invention.

Referring now to FIG. 1, there is illustrated an artificial reef module 10 comprising a column 12 and a base or anchoring structure 14 to which the column 12 is attached. Column 12 includes a top surface 13, sides 15 and 17, and ends 18 and 19. The column 12 consists of a series of adjacent layers of corrugated sheets 16, which are attached to each other in a vertical rise. In FIG. 1, only the uppermost three sheets 16 of column 12 are illustrated for purposes of description. The remainder of column 12, illustrated in phantom, is assumed to include layers of sheets 16 much like that illustrated in FIG. 2.

Figure 10:
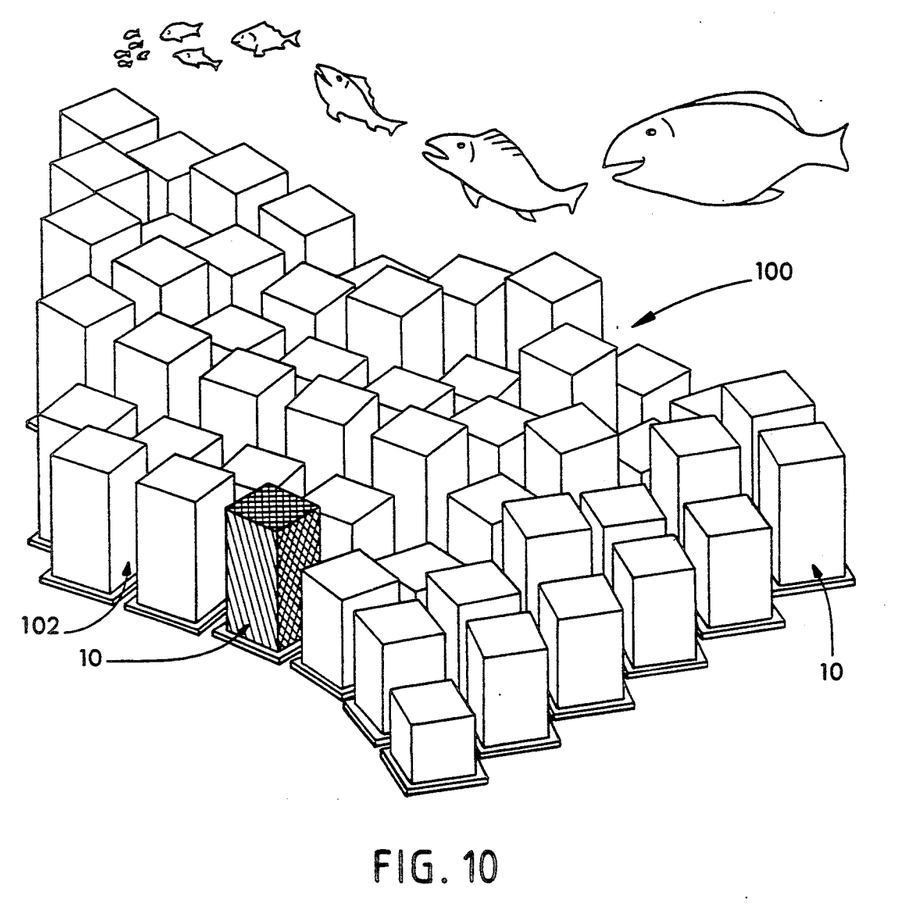
FIG. 10 is a perspective view of an artificial reef unit illustrating the selective positioning of artificial reef modules.

The term "vertical rise" implies that each sheet 16 is substantially horizontally disposed in parallel with the base 14. In this manner, the vertical stacking provides indefinitely variable height options within practical boundaries. Alternatively, it is within the scope of the present invention to form the column 12 in a horizontal rise, i.e., the sheets 16 are situated perpendicularly with respect to the base 14, as illustrated in FIG. 10.

The base 14 is attached to the bottom surface of the column 12 to provide an anchoring system for the module when it is placed under water. Reference is made to U.S. Pat. No. 4,913,094, incorporated herein by reference, for a further description of the base and method of attaching the column 12 to the base.

The sheets 16 may be made of a variety of different materials including, for example, plasticized or unplasticized polyvinyl chloride (PVC) and polystyrene. It is also within the scope of the present invention to utilize galvanized steel, aluminum, and other materials for the composition of each sheet 16. The primary criterion is to provide a material which is capable of being bonded to like materials, which can be formed into a desired shape, which will not rapidly disintegrate in water, particularly salt water, and which provides surface conducive to the attraction and settling of desired microorganisms.

Each sheet 16 is bonded to an adjacent sheet by any of a variety of methods known to the art, such as, for example, gluing, welding, and binding an entire group of layers with wire or other binding materials. Without wishing to be limited to the disclosure therein, it is also within the scope of the invention and the preferred embodiment to secure the layers using "dedicated glue joints," according to the disclosure of Rye U.S. Pat. No. 4,668,443, which disclosure is incorporated herein by reference in its entirety. In Rye, the apex, i.e., upper ridge, of each flute is provided with a plurality of "positioner pads," such that at least about 80% of the intersections of adjacent sheets contain abutting pairs of positioner pads. The sheets 16 are joined by cementing the positioner pads of adjacent sheets together.

As illustrated in FIGS. 1-5, each of the adjacent sheets 16 have a corrugated appearance. By this, it is meant that the sheet 16 is extruded or otherwise formed such that there are a plurality of flutes 20 or "peaks and valleys" in each sheet 16. Each flute 20 includes an upper apex 22 converging sidewalls 24 and a lower channelway 26.

Figure 8:
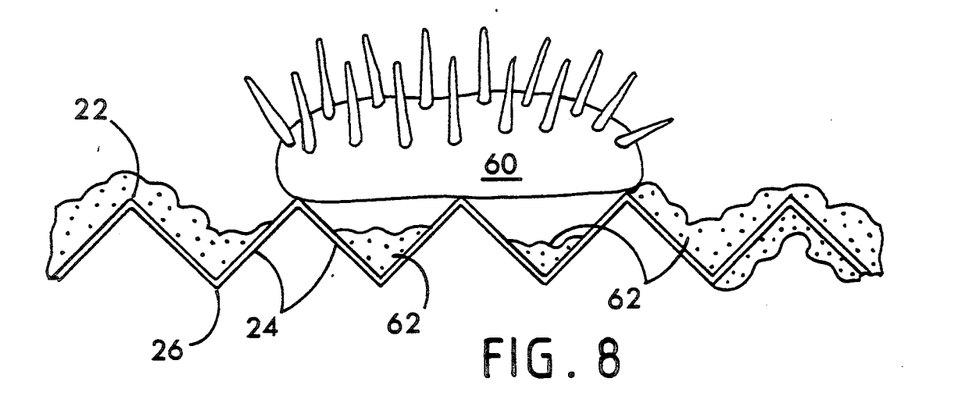
FIG. 8 is a side elevated view of the sea urchin of FIG. 7 resting on the top sheet of the module.
Figure 9:
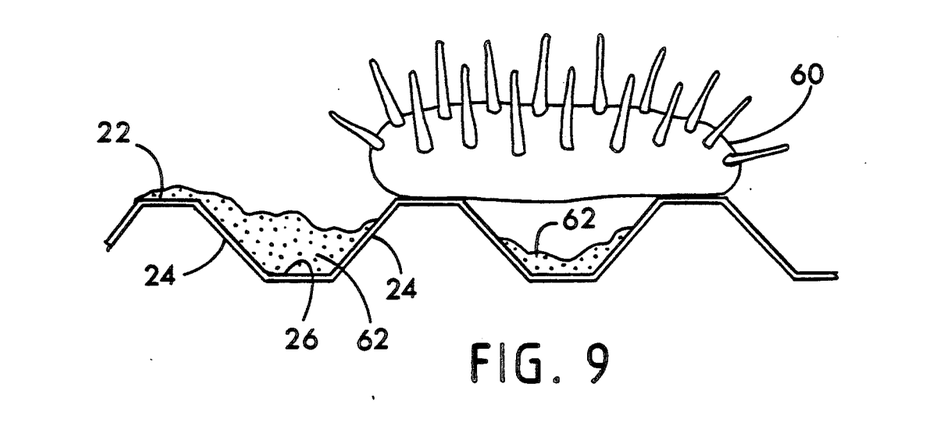
FIG. 9 is a side elevated view of the sea urchin of FIG. 7 resting on the top panel of a second embodiment of the module.

The apex 22 of the flute 20 may resemble a peak, as illustrated in FIG. 8, or may have a planar surface, as illustrated in FIG. 9. Likewise, the channelway 26 may be angled, as illustrated in FIG. 8, or may have a planar surface, as illustrated in FIG. 9.

The sheets 16 are joined to each other such that the flutes 20 of each sheet 16 are transverse with respect to the flutes 20 of an adjacent sheet. By the term "transverse" it is meant that the direction of the flutes 20 of one sheet 16 is not parallel to the 15 direction of the flutes 20 of an adjacent sheet 16. The flutes 20 of one sheet 16 may be at an angle between about 5° and 90° from the direction of an adjacent sheet 16. Preferably, the direction of flutes 20 of one sheet 16 is at an angle of about 60° to an adjacent sheet 16.

This transverse spatial arrangement of the flutes 20 provides a surface area upon which, and a volume within which, the microorganisms may thrive. It also provides a complex array of channels within the module 10, which is a key factor in the attraction of fish. The numbers of chambers and openings in the reef module 10 is very important to the ecosystem created by the module 10.

Figure 2:
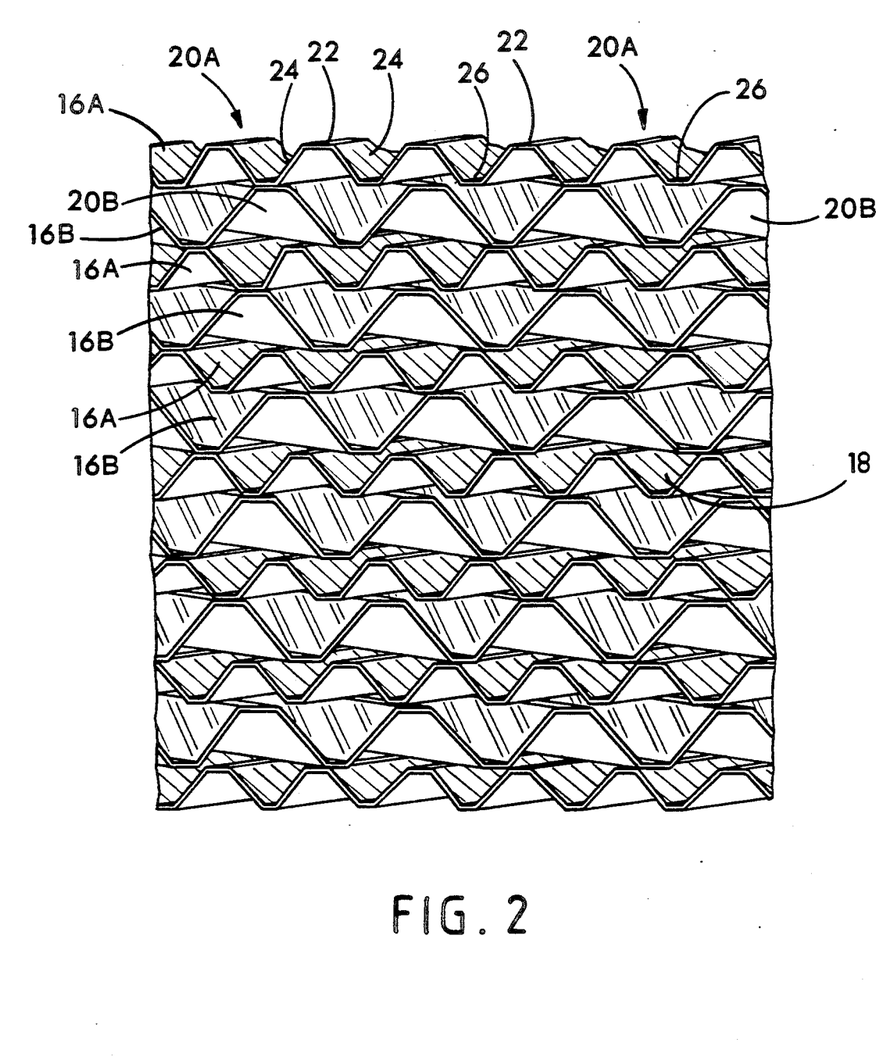
FIG. 2 is an elevated view of the module of FIG. 1 along line 2—2 of FIG. 1.
Figure 3:
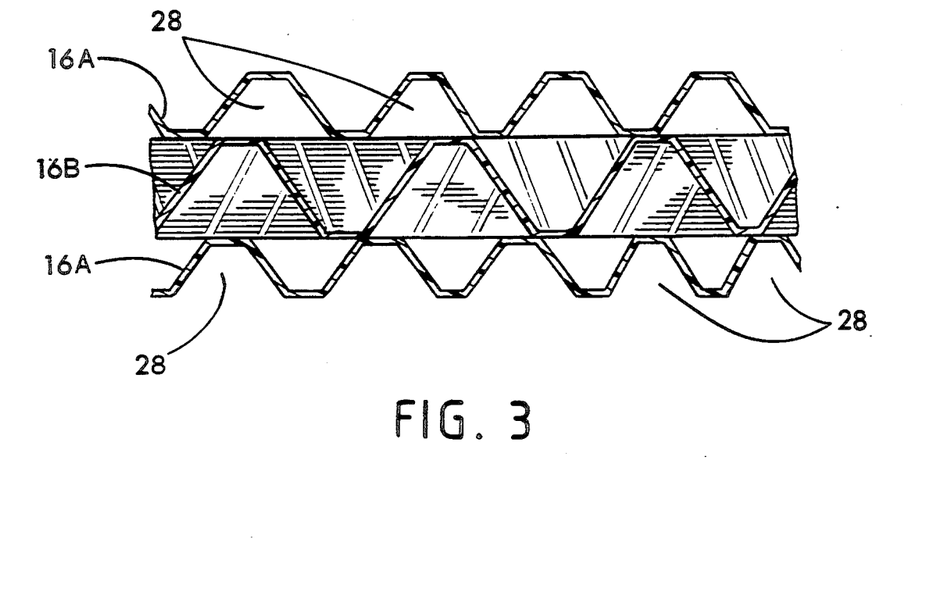
FIG. 3 is a partial angled cross-sectional view of the module of FIG. 1 along line 3—3 of FIG. 1.
Figure 4:
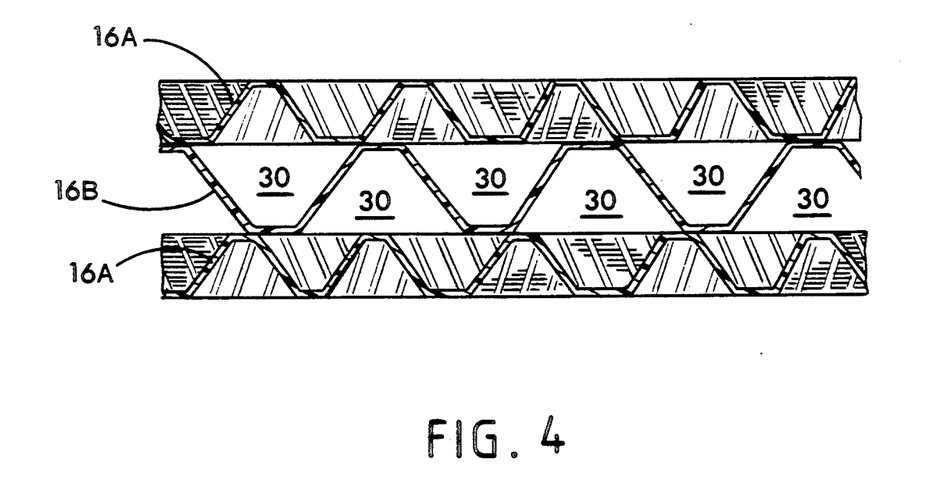
FIG. 4 is a partial angled cross-sectional view of the module of FIG. 1 along line 4—4 of FIG. 1.

Whereas the system disclosed in the inventors' own U.S. Pat. No. 4,913,094 only provides for flutes with the same height throughout the module, the present invention is directed to a module 10 which includes sheets 16 having flutes 20 of varying heights. As illustrated in FIGS. 2-4, there are provided alternating sheets 16 of flutes 20 in which the sidewalls 24 have varying heights. As illustrated in FIG. 2, alternating sheets 16A have a flute height which is smaller than the flute height in sheets 16B. As indicated elsewhere, the differences in flute height promote the settlement and nourishment of the nutrient microorganisms on the surfaces of the sheets of the module 10.

Because each of the sheets 16A, 16B are joined in a manner such that the flutes 20 are in a transverse pattern, the module 10 includes a complexity of circuitous channels and passageways 28, 30, illustrated in FIGS. 3 and 4, which has advantages both in terms of a protective environment and a filtering/settling function.

The channel structure 28, 30 is illustrated best with respect to the cross-sectional views 2-4. FIG. 2 illustrates an elevational cross-sectional view of the module 10 taken along line 2—2 of FIG. 1. As illustrated in that FIGURE, sheets 16A are provided with flutes 20A of a height substantially smaller than the flutes 20B of an adjacent sheet 16B. Referring now to FIG. 3, which illustrates an angular cross-sectional view of a portion of the module 10 of FIG. 1 taken along line 3—3, the small channels 28 are illustrated. The large channels 30 are seen by viewing the module 10 along lines 4—4, as illustrated in FIG. 4. Thus, both the small channels 28 and the large channels 30 are accessible through the ends 18, 19 of the module 10.

Figure 5:
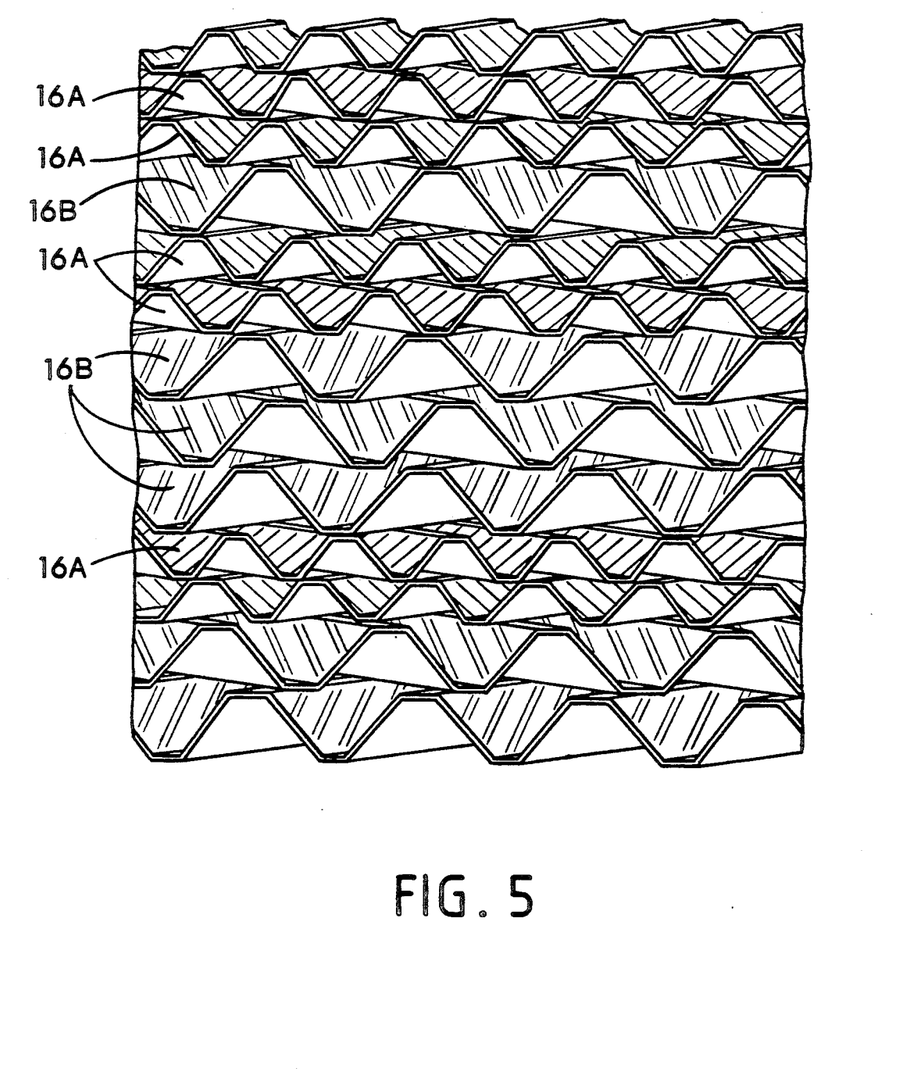
FIG. 5 is an elevated view of a second embodiment of the module of FIG. 1 along line 2—2 of FIG. 1.

It is also within the scope of the invention to provide a module 10 in which the adjacent layers of sheets 16 have a mixed array of uniform and different flute sizes, as illustrated in FIG. 5. This provides an even more enhanced module of complex channels and filtering elements.

The size of each module 10 is variable. Additionally, the module 10 can take on virtually any geometric shape. It is preferred to form the module 10 such that each sheet 16 is rectangular or squared in appearance with dimensions extending from about 1 foot (30.5 cm) to about 6 feet (182.9 cm), most preferably 4 feet (121.9 cm). The height of the sidewalls can range from about ½ inch (1.27 cm) to about 4 inches (10.16 cm) or more.

In use, one or more modules 10 is deployed to a body of water, preferably an ocean, lake or pond. The modules are placed in the body of water such that they will rest on the bottom surface of the body of water. Although not necessary, it is preferred that the artificial reef module be placed in an area close enough to the water surface such that the artificial reef system benefits from a phototropic environment. Because the primary purpose of the module 10 is to attract marine life, it is necessary to place the module 10 in an underwater environment which will induce microorganism development on the surface area of the module. An area which provides for water movement, i.e., water current is generally all that is needed. The water current carries the microbial populations, which provide the necessary beginnings of the marine life food chain.

The food chain necessary to support life undersea generally begins at the microorganism level. Microorganisms, which receive their nutrients from the sea, feed larger fish and so on up the food chain. Aerobic microorganisms, i.e., microorganisms which require oxygen to survive, are the preferred microorganisms to settle on the structure as they provide a sound base in the initial stages of the food chain.

Figure 6:
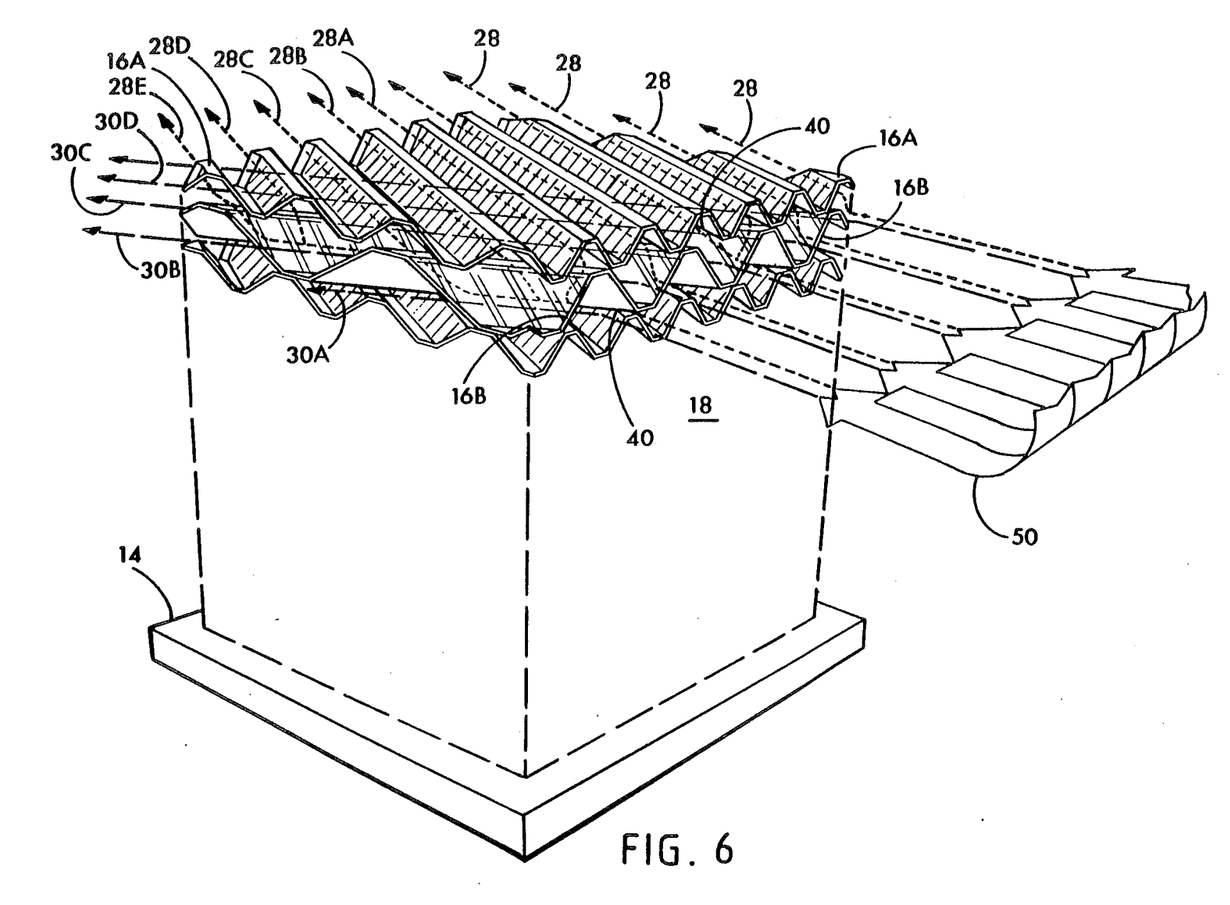
FIG. 6 is a perspective view of the module of FIG. 1 showing the wave pattern as a current of water enters the module.

Referring now to FIG. 6, after the module 10 has been placed underwater, the module begins to attract microorganisms by means of ocean or water current, herein designated 50, which flows through the various channels 28, 30 of the column 12.

The system of channels 28, 30 formed by the adjacent placement of the corrugated sheets 16, provides a convoluted, sinusoidal passageway for water to flow through the module 10. For example, water current 50 enters the module 10 at end 18. At this point, due to the convoluted nature of the channels 28, 30, a portion of the water current will be allowed to flow in steady manner along channel 30A of sheet 16B. Due to the partial blockage of channel 30A caused by the side walls 24 of the small flutes 20A of sheet 16A, a portion of the water current 50 will be diverted along the channel 28A. At various intervals along the channel 28, the water current 50 will be intercepted by other channels 30B, 30C, 30D, etc. Likewise, water flowing along any of channels 30A, B, C, D . . . , can be intercepted by follow-up channels 28B, C, D . . . , . At each point 40 of interception, a portion of the water current will then be diverted along these channels, until finally the initial water current, illustrated at 50, will emerge at several points from the sides 15, 17 and end 19 of the module 10.

The convoluted nature of water current passing through the module 10 provides an important filtering phenomenon in the reef module 10. A primary function of the reef module 10 is to concentrate nutrients, both for microorganisms and larger forms of aquatic development. It will do this by the attraction of these molecular organisms in the water to the surface of the sheets 16 as the organisms pass through the module 10. The passage of the water through the module is retarded due to the convoluted nature of the channels 28, 30.

Additionally, the retardation of fluid flow causes desired elements in the water to fall out of the water and attach to the surface of the sheets 16 of the module 10.

At each point 40 of interception along channels 28 and 30, there is developed a mixing/redistribution area in which the water current is swirled into a vortex causing material in the water to settle at that distribution point 40. Thus, the points 40 of interception provide "areas of growth," which creates further development and growth of microorganisms within the channels 28 and 30. The redistribution points 40 also provide other advantages. For example, the encrusting of large amounts of microorganisms on each of the redistribution points, which are also the points of contact between adjacent sheets, i.e., glue joints, will assist in adhering the adjacent sheets 16 together.

The redistribution points are also necessary to sustain the microorganism life which attach to the infrastructure of the module. In order to attract aerobic microorganisms to survive and settle in the infrastructure of the module, a constant oxygen supply from the water is required. For an attached microorganism, oxygen is extracted from the water as it passes over the animal. A turbulent water supply is therefore preferable to provide more of the necessary oxygen supply to the microorganism. Therefore, an object of this invention is to provide a module which will maximize the water-surface contact such that the surface of the module where the microorganisms are attached and proliferating is continually replenished with oxygen from the water. This is achieved by the mixing and redistribution points 40 within the module. As water passes through each channel of the module, it comes in contact with the mixing and redistribution points 40 causing the water to swirl within the channel. The swirling action promotes oxygen contact with the microorganisms which have attached to the surface of each sheet 16 in the module. The oxygen provides the microorganisms with the necessary sustenance to thrive and multiply.

Figure 7:
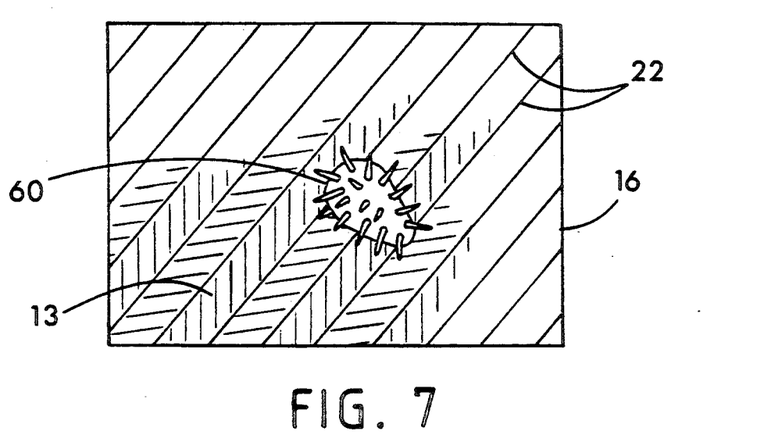
FIG. 7 is a top elevated view of the module of FIG. 1 illustrating an ocean grazer, i.e., a sea urchin, thereon.

FIG. 7 illustrates a top plan view of the top surface 13 of the uppermost sheet 16 of the module 10, in which a foraging sea creature 60, such as a sea urchin, has attached and is grazing thereon. Animals such as sea urchins are known as foraging predators. Left undisturbed, the urchin will completely denude a surface of microbes. While the purpose of the artificial reef is to enhance the growth and population of all sea creatures, a certain balance is required. Therefore, it is necessary to provide a reef module for foraging predators, such as the sea urchin, but it is also necessary to provide an environment which will not allow itself to become completely denuded, i.e., void of food or microbial particles on the surface 13 of the sheets 16. The loss or destruction of microorganisms eliminates one of the primary reasons for the placement of an artificial reef module in the water, i.e., the sustenance of undersea animal life.

The present invention addresses this issue by providing the surface of each sheet 16 with a channelway 26 having angular side walls 24 of sufficient depth to prevent foraging animals from completely denuding the surface thereon. In this manner, an animal 60 can forage and possibly denude a portion of the sidewall 24 of each flute 20 near the apex 22 the upper surfaces of the sheet 16; but will be prevented, due to the design of the flute 20, from invading the lowermost portion of the sidewall 24 near the channelways 26 of the channels 28, 30. The microbial material 62 will then be allowed to proliferate near the channelways 26.

This partial grazing function allows for surface areas on the sheets 16 to be open for new organismal settling, increasing the diversity of the structures over time. It is known that the establishment of organisms on a surface occurs in waves of monospecific, e.g., one species, populations or monocultures. This maximizes the establishment of a particular species of microorganism. The grazing function conducted by predatory animals opens new spaces at times when other marine organisms can establish themselves. Since the complete grazing by predators is not allowed, some of the microbial organisms are always left behind. After a period of time, the number and types of organisms will become quite varied, which also has advantages in attracting a diverse population of sea creatures.

The physical design of the system enhances subsequent successional stages of reef development by promoting biofouling community development through its settling ability. Larval organisms, which pass through the openings at ends 18, 19 of the module are rapidly settled. Because of its protective surface area available and large surface-to-volume ratio, settling organisms find themselves in a fertile environment in which they grow and prosper. This secondary growth becomes food for larger reef dependent fish. By creating an environment similar to a natural reef foundation, a highly productive structure is formed for the attraction of a large variety of marine life. Forage provided by the structure of the present invention will continue to attract marine life over an extended period of time.

Eventually, it is expected that microbial attachment and biofouling of the artificial reef system of the present invention will become sufficient to completely hide the artificial reef system from view, thereby creating what appears to be a natural reef system.

The reef modules exhibit three characteristics that would prove a structure to be optimum as an artificial reef:
(1) structural complexity;
(2) durability; and
(3) the ability to attract a diverse population of organisms.

The complexity of the reef modules accommodates a highly diverse assemblage of organisms found on most natural reef systems.

Reference is now made to FIG. 10, which illustrates an artificial reef unit 100, comprised of several artificial reef modules 10 of a variety of heights, positioned in a body of water. While not wishing to limited to any parameters of size, it is envisioned that a unit 100, as herein illustrated, is most effective when the occupied volume of reef material ranges from 25,000 to 130,000 m³. The distance separating each module 10 in the unit 100 should be sufficient to allow passages 102 for the migration and protection for smaller species of marine life while inhibiting the ingress of larger species of marine life. A preferred distance between each module is a length from about 8 inches (20.3 cm) to 15 inches (38.1 cm).

Large reefs appear to be more productive than small reefs. There seems to be no clear evidence regarding the effect of module height on fish attraction. While height is observed to be important to migratory species, whereas horizontal spread appears the most desirable attribute to demersal species. The optimum observed effect in fish attraction is the reef profile, as illustrated in FIG. 10.

It is also within the scope of the present invention to place "sets," incorporating two or more units 100, in close proximity to each other on the floor of a body of water. The distance between each unit in the set can range from approximately 2-3 feet (0.6-0.9 meters) to ½ mile (0.8 kilometers[statute]) or more. The distance between the sets advantageously provides an attractant for larger species of marine life, such as sharks, which generally prefer open spaces but require a reef for its food source.

A "cluster" of similarly positioned sets may then be formed with the distance between each set in the cluster being significantly greater than the distance between each unit in the set.

Finally, there is envisioned a full reef "complex," consisting of several clusters on the floor of a body of water. The complex can cover a vast area of floor up to several square miles in diameter.

It is understood that the invention is not confined to the particular construction and arrangement herein illustrated and described, but embraces such modified forms thereof as come within the scope of the following claims.

What is claimed is:

1. An artificial reef module for substantially permanent submergence underwater and for providing forage and shelter for small fish and crustaceans, comprising:
   a) a column formed of a plurality of planar sheets, each sheet comprising a plurality of parallel flutes, said sheets being superposed and attached together along their length with the respective flutes of adjacent sheets extending transverse to each other to form a plurality of channels and mixing and redistribution points for microorganisms within a fluid environment, wherein at least one sheet of the column includes flutes having a different height from the flutes of an adjacent sheet; and
   b) anchoring means attached to one end of the column for securing the column to the floor of a body of water.

2. The module of claim 1 wherein the sheets are formed of polyvinyl chloride.

3. The module of claim 1 wherein the flutes include sidewalls positioned at an angle and depth sufficient to prevent the total denuding of the planar sheets by predatory animals.

4. The module of claim 1 wherein the series of transverse passageways include means for removing microorganisms from water currents flowing therethrough.

5. An artificial reef unit comprising at least two artificial reef modules of claim 1.

6. A device for establishing a variety of populations of heterogenous organisms on an artificial reef module, comprising:
   a) a column formed of a plurality of planar sheets, each sheet comprising a plurality of parallel flutes, said sheets being superposed and attached together along their length with the respective flutes of adjacent sheets extending transverse to each other to form a plurality of channels and mixing and redistribution points for microorganisms within a fluid environment, wherein at least one sheet of the column includes flutes having a different height from the flutes of an adjacent sheet, wherein the flutes of each planar sheet include sidewalls positioned at an angle and depth sufficient to prevent the total denuding of microorganisms from the surface of the planar sheet by predatory organisms; and
   b) anchoring means attached to one end of the column for securing the column to the floor of a body of water.

7. A method for establishing a variety of species of marine life in an underwater locale, comprising:
   a) placing one or more artificial reef modules in a body of water inhabited by the marine life, each artificial reef module comprising: a column formed of a plurality of planar sheets, each sheet having a surface and comprising a plurality of parallel flutes, said sheets being superposed and attached together along their length with the respective flutes of adjacent sheets extending transverse to each other to form a plurality of channels and mixing and redistribution points for microorganisms within a fluid environment, wherein at least one sheet of the column includes flutes having a different height from the flutes of an adjacent sheet, and anchoring means attached to one end of the column for securing the column to the floor of a body of water in the locale;
   b) settling and developing a microbial population of a first species of microorganisms on the artificial reef module;
   c) partially denuding the surface of the artificial reef module;
   d) settling and developing a microbial population of a second species of microorganism on the module sufficient to provide for a suitable attractant for fish attracted to that particular species; and
   e) continuing steps b)–d) such that other species of microorganisms settle and develop on the artificial reef module.

* * * * *